United States Patent
Chang et al.

(10) Patent No.: US 9,502,067 B1
(45) Date of Patent: Nov. 22, 2016

(54) OPTICAL DISC WITH COPY PROTECTION FILE SYSTEM FORMAT AND METHOD OF MAKING SUCH DISC

(71) Applicants: Shuo Wei Chang, Monterey Park, CA (US); Liao-Hsuan Kuo, Taipei (TW); Chun-Sung Wu, Taipei (TW)

(72) Inventors: Shuo Wei Chang, Monterey Park, CA (US); Liao-Hsuan Kuo, Taipei (TW); Chun-Sung Wu, Taipei (TW)

(73) Assignee: VINPOWER, INC., Alhambra, CA (US)

( * ) Notice: Subject to any disclaimer, the term of this patent is extended or adjusted under 35 U.S.C. 154(b) by 0 days.

(21) Appl. No.: 15/134,666

(22) Filed: Apr. 21, 2016

(30) Foreign Application Priority Data

Dec. 15, 2015 (TW) .............................. 104142060 A

(51) Int. Cl.
G11B 11/00 (2006.01)
G11B 7/013 (2006.01)
G11B 7/007 (2006.01)

(52) U.S. Cl.
CPC ........... *G11B 7/013* (2013.01); *G11B 7/00736* (2013.01)

(58) Field of Classification Search
CPC .................. G11B 2220/20; G11B 2220/2537; G11B 20/00086; G11B 20/1217; G11B 27/329; G11B 2220/218; G11B 7/24; G11B 27/3027
USPC ............ 369/53.1, 53.21, 53.16, 53.24, 59.25
See application file for complete search history.

(56) References Cited

U.S. PATENT DOCUMENTS 7,126,906 B2 * 10/2006 Iida ....................... G06F 3/0677
369/111

* cited by examiner

*Primary Examiner* — Nabil Hindi
(74) *Attorney, Agent, or Firm* — Jen-Feng Lee, Esq.

(57) ABSTRACT

The present invention provides an improved file system format for an optical disc to help prevent illegal copying of multimedia content, where certain non-readable data record is placed into increased measured length of a multimedia data block; disc made pursuant to present format allows normal playback with very low level noise that would not affect the user enjoyment of viewing/listening the movie or music content on the multimedia disc.

7 Claims, 3 Drawing Sheets

US 9,502,067 B1

OPTICAL DISC WITH COPY PROTECTION FILE SYSTEM FORMAT AND METHOD OF MAKING SUCH DISC

PRIORITY CLAIM

The present invention claims the foreign priority of a Republic of China application, number 104142060, having priority date of Dec. 15, 2015. A copy of said application is submitted along with this application.

FIELD AND BACKGROUND OF THE INVENTION

The present invention relates to a file system format for an optical disc for preventing illegal copying, and the method of burning/making such a disc based upon such format.

Optical discs allow for the storage of large amount of computer information and/or digital documents, thanks to its technical attribute of huge capacity and ease of reproduction. Consequently, optical discs are used to store multimedia files and records such as music or movies, enabling music or movie makers to mass produce artistic works and offer for sales to the public.

The same advantage of huge capacity and ease of reproduction also facilitate the theft of intellectual property in the form of protected content on optical disc being easily stolen by simply making illegal copies of multimedia disc for movies and music works.

Certain copy-prevention technology was proposed, such as U.S. application Ser. No. 12/867,610, publication number 2011/0122752, entitled Copy Protection System for Optical Discs ("752 Publication").

The 752 Publication disclosed a system file format consisting primarily and sequentially of a start encapsulation block 4, a ISO/UDF system block 6, a navigational data block 12, at least an initialization data block 14, at least a title set block 16, a final encapsulation block 18, and an end encapsulation block 10.

The system file format for an optical disc pursuant to the 752 Publication then uses two indexes to navigate the content on the disc, for pointing to the actual content area as well as to indicate certain copy protection blocks containing unreadable data records.

The 752 Publication's copy-protection structure is no longer effective. There are known hackers who can circumvent the indexing mechanism, or do a certain reverse-indexing action, to avoid encountering non-readable data, thus avoiding the "failure to access" signal that would lead to aborting a copying action.

Present application aimed to improve the shortcoming of the copy-protection as disclosed in the 752 Publication and provided a effective structure that can be easily implemented.

SUMMARY OF THE INVENTION

Present invention disclosed a file system format for an optical disc that provides an improved mechanism to help with the prevention of illegal copying of multimedia data content that's usually protected under copyright law, or other intellectual property protection.

The file system format disclosed contains a lead-in block, a metadata block, a multimedia data block, and a lead-out block. The four blocks are set in a sequential order described herein.

An optical disc made pursuant to the disclosure of present application will have a multimedia data block that contains at least a multimedia data record and at least a non-readable data record.

The non-readable data record serves to trigger a "failure of access" status in common copier/burner devices.

If a copier/burner reads the at least a multimedia record, via an index mechanism, to access the source multimedia record for the purpose of making a copy, the copier/burner will inevitably read the at least a non-readable data record residing within the multimedia data block, causing the "copy" action to fail, on account of encountering unreadable data.

The disclosure herein prevents the copying even if the index mechanism is designed to avoid the reading access to avoid some bad sectors or unreadable data records that are outside of the multimedia data block.

During normal playback by a multimedia player, either a hardware device or a software player, some very small amount of noise will be generated by the multimedia player when encountering the non-readable data records; however, this will not affect the overall performance, as such noise can hardly be detected by users during playback time. This very small amount of noise is like watching a movie, where the non-readable data records in the multimedia data block will produce very low level noise in the movie images, in a small limited viewing area. However, movie goers will not likely to detect such noise, given the very low level noise.

DESCRIPTION OF THE DRAWINGS

The accompanying drawings, which are incorporated in and constitute a part of this specification, illustrate the preferred embodiments of the invention and together with the description, serve to explain the principles of the invention.

A brief description of the drawings is as follows.

DETAILED DESCRIPTION OF THE PREFERRED EMBODIMENT

To achieve the goal of preventing illegal copying, the optical discs of present invention will have a file system format as described herein.

Figure 1:
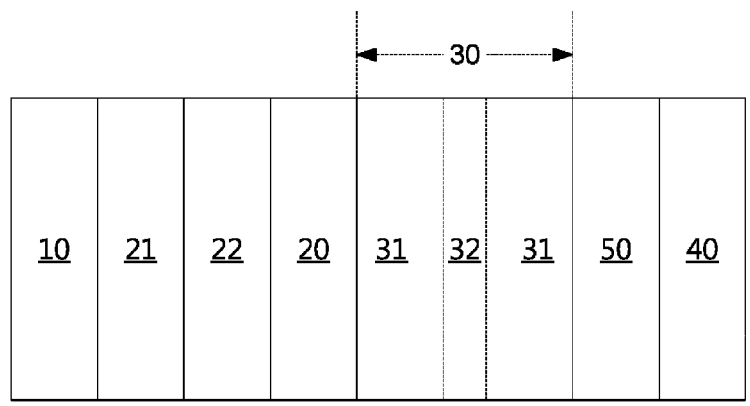
FIG. 1 is a preferred embodiment of the file system format as disclosed in the present application.

As shown in FIG. 1, a multimedia optical disc consists of a file system format that contains a lead-in block 10, a metadata block 20, a multimedia data block 30, and a lead-out block 40. The four blocks are set in a sequential order described herein.

The metadata block 20 contains a plurality of records to show data attributes.

An optical disc made pursuant to the system file format disclosed herein will have a multimedia data block 30 containing at least a multimedia data record 31 and at least a non-readable data record 32.

For ease of understanding and drafting, the elements of the multimedia data record 31 and the non-readable data record 32 are generally expressed in their singular form.

However, multiple units of these elements may be intended based upon the context as appropriate.

In a preferred embodiment, the at least a non-readable data record 32 is set to a random position within the multimedia data block 30, increasing the measured length of the multimedia data records 31.

In yet another preferred embodiment, multiple non-readable data records 32 can be set to different random positions within the multimedia data block 30, thus increasing the measured length of the multimedia data records 31.

In yet another preferred embodiment, the at least a non-readable data record 32 is set to a position after the ending of the multimedia data records 31 within the multimedia data block 30.

If a copier/burner reads the at least a multimedia data record 31, via an index mechanism, to access the source multimedia record for the purpose of making a copy, the copier/burner will inevitably read the at least a non-readable data record 32 residing within the multimedia data block 30, causing a "copy" action to fail, on account of encountering unreadable data.

The disclosure herein prevents the copying even if the index mechanism is designed to direct the reading access to avoid some bad sectors or unreadable data records that are outside of the multimedia data block 30.

In the preferred embodiment, the multimedia data records 31 are in the form of a streaming file, whereas the non-readable data records 32 are treated as bad sectors. During normal playback by a multimedia player, either a hardware device or a software player, the non-readable data records 32 will be accessed/read but will not cause the player to stop the playback action.

Some very small amount of noise will be generated by the multimedia player when encountering the non-readable data records 32; however, this will not affect the overall performance, as such noise can hardly be detected by users during playback time. This very small amount of noise is equivalent to some low level background noise. This is like watching a movie, where the non-readable data records 32 in the multimedia data block 30 will produce very low level noise in the movie images, in a small limited viewing area. However, movie goers will not likely to detect such noise, given the very low level noise.

As such, although the multimedia playback of a disc pursuant to the disclosure of the present application will generate very low level noise, the noise will not rise to the level where the consumers, viewers/listeners of movies or music, will make any complaint. The upside of preventing illegal copying of protected content, such as those protected under copyright or patent law, more than justify the generation of the low noise.

Yet another preferred embodiment of the multimedia optical disc's file system format contains a primary volume descriptor block 21, a logical volume descriptor block 22 and a mirror image block 50.

The primary volume descriptor block 21 is set after the lead-in block 10; the logical volume descriptor block 22 is set between the primary volume descriptor block 21 and the meta data block 20.

The primary volume descriptor block 21, the logical volume descriptor block 22, and the meta data block 20 are used to describe the multimedia file size, type, and location information of the multimedia data records 31 residing inside the multimedia data block 30, to enable a multimedia player to accurately read the needed multimedia data records 31.

The mirror image block 50 is set between the multimedia data block 30 and the lead-out block 40. The mirror image block 50 is used to protect the integrity of the data structure of the file system.

Figure 2:
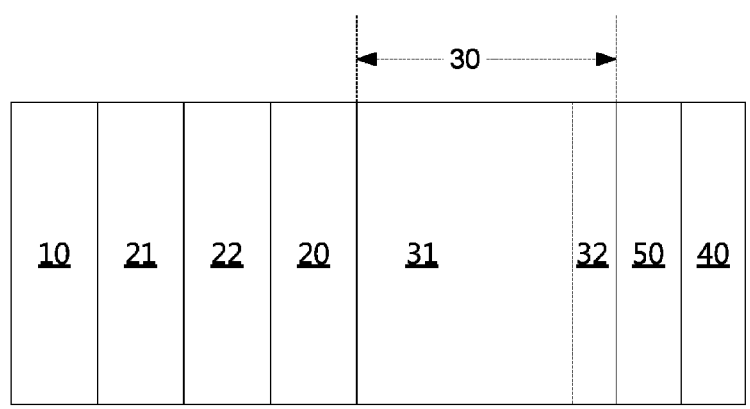
FIG. 2 is another preferred embodiment of the file system format as disclosed in the present application.

Referencing FIG. 2, the non-readable data record 32 is set after the ending portion of the multimedia data records 31 and is merged into the multimedia data records 31, to increase the measured length of the multimedia data records 31.

As such, during normal playback of the multimedia data records, when the original multimedia data records 31 are done playing, then the non-readable data records 32 are accessed by the player. Since the original content is done, before the non-readable data records 32 are accessed, which would generate a very low amount of noise, the users would not be affected negatively, for the experience of viewing/watching/listening the multimedia content such as music or movies.

If an act of illegal copying is attempted, certain non-readable data record 32 that is/are placed within the multimedia data block 30, either at random location, or at a specific location within the multimedia data block 30 will call the "failure to access/read" type of trigger to happen, and preventing the action of illegal copying.

Figure 3:
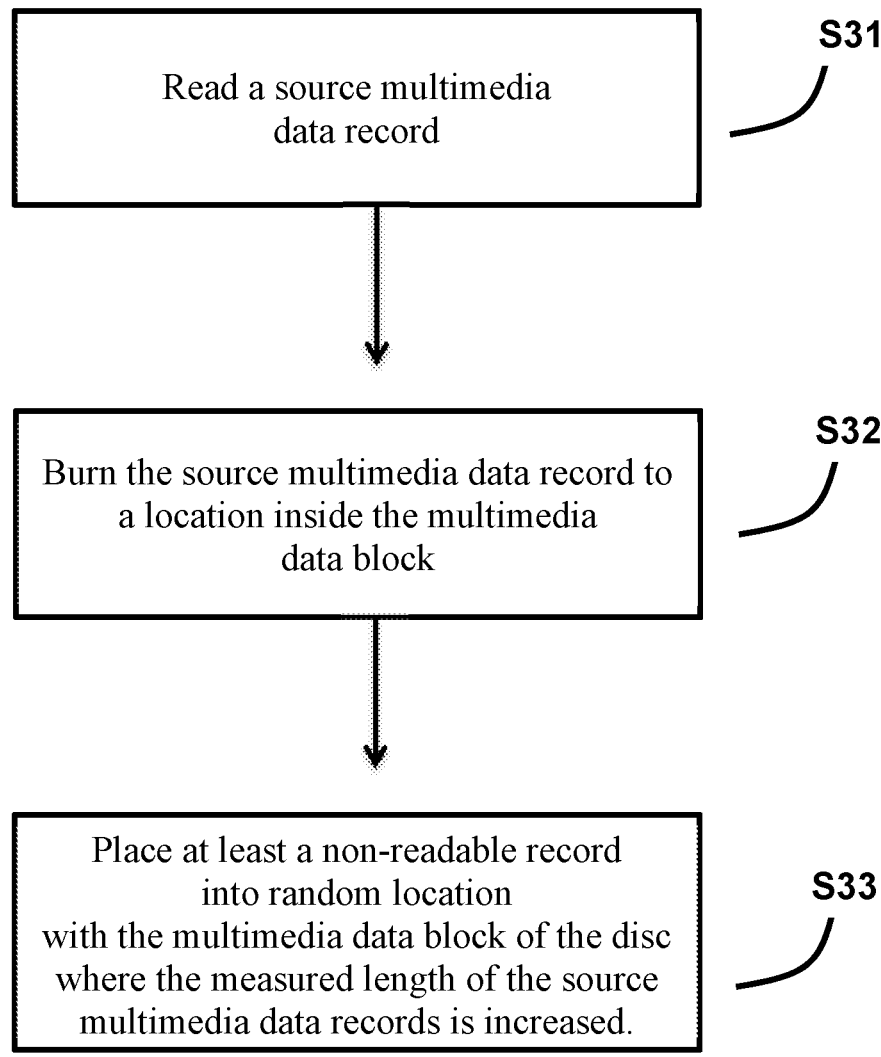
FIG. 3 is a preferred embodiment of the process of burning a disc as disclosed in the present application.
Figure 4:
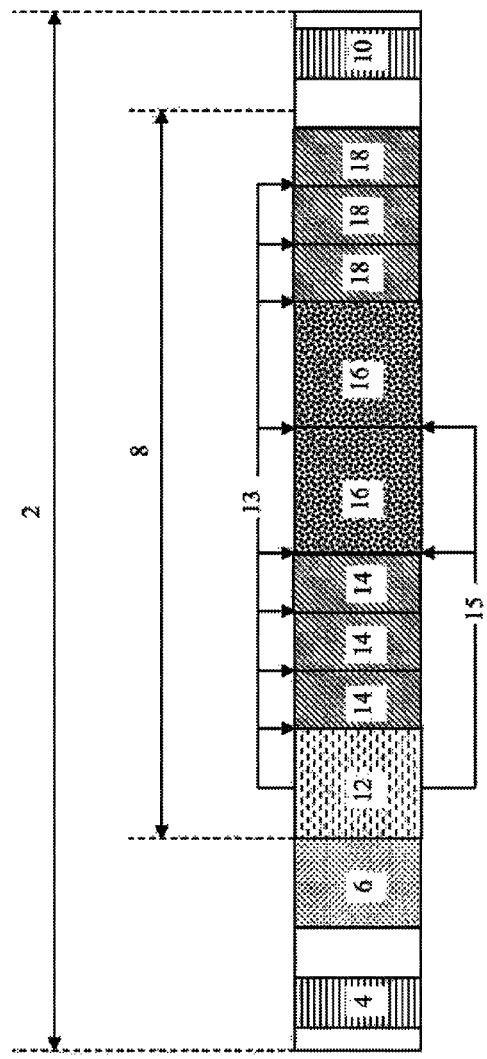
FIG. 4 shows the file system format employed by copy-prevention disc technology currently available on the market.

FIG. 3 shows the process of burning a multimedia disc containing a file system format as disclosed in present application.

Step S31 is to read/access a source multimedia data record 31.

Step S32 is to burn the source multimedia data record 31 to a location inside the multimedia data block 30.

Step S33 is to place at least a non-readable data record 32 into a random location within the multimedia data block 30 where the measured length of the source multimedia data records 31 is increased.

Alternatively, the Step S33 can have the non-readable data record 32 burned to a position after the ending of the multimedia data records 31 within the multimedia data block 30, or other specific location relative to the source multimedia data records 31 as may be chosen by different implementations.

An optical disc with a file system format made pursuant to the disclosure herein will have the capacity of preventing illegal copying, when a copier/burner reads to access multimedia content, it will experience a "read/access failure" due to encountering the non-readable data record 32 when accessing the multimedia data block 30.

What is claimed is:

1. An optical disc of certain file system format to store multimedia data, the format comprising:
   A lead-in block;
   A metadata block having a plurality of data attribute records;
   A multimedia data block having at least a multimedia data record and at least a non-readable data record; and
   A lead-out block,
   wherein the four blocks are set in the sequential order described herein and the at least a non-readable data record is set at random position within the multimedia data block to increase the measured length of the multimedia data records.

2. The optical disc of claim 1, wherein the at least a non-readable data record is set after the ending position of the multimedia data records within the multimedia data block.

3. The optical disc of claim 2, further comprising a primary volume descriptor block set immediately after the lead-in block and a logical volume descriptor block set between the primary volume descriptor and the metadata block.

4. The optical disc of claim 2, the system file format further compromising a mirror block set between the multimedia data block and the lead-out block.

5. A method for burning a multimedia optical disc to have a file system format for preventing illegal copying, comprising the steps of:
   a. Read a source multimedia data record;
   b. Burn the source multimedia data record to a location inside the multimedia data block; and
   c. Place at least a non-readable record into random location with the multimedia data block of the disc where the measured length of the source multimedia data records is increased.

6. The method of burning a multimedia disc of claim 5, wherein the step of burning the source multimedia data records includes first padding up the length of source multimedia data records before burning the increased-length source multimedia data records to the multimedia data block.

7. The method of burning a multimedia disc of claim 5, wherein the step of placing at least a non-readable data record includes first padding up the length of source multimedia data records before burning the increased-length source multimedia data records to the multimedia data block and placing the at least a non-readable record to a specific location relative to the source multimedia data records in the multimedia data block.

* * * * *